Figure 4:
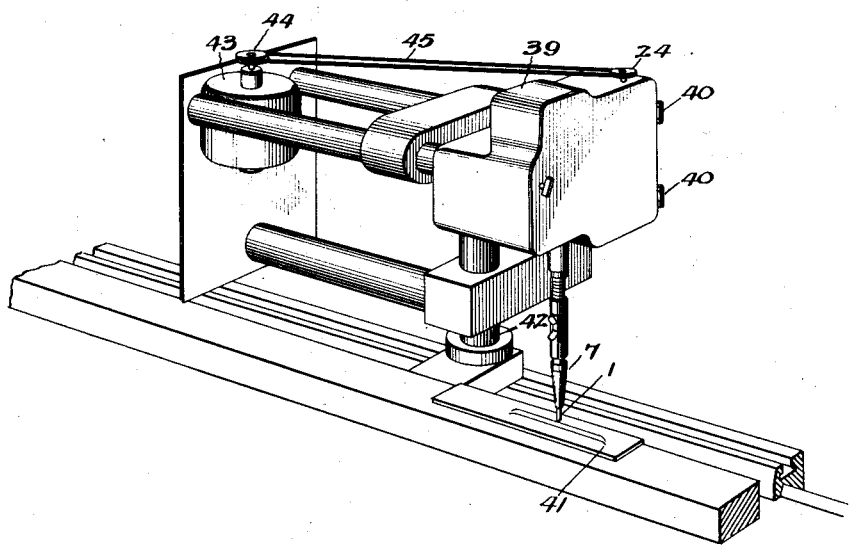

June 9, 1925.
W. L. MERRILL
ARC WELDING MACHINE
Filed April 28, 1924   3 Sheets-Sheet 1
1,541,582
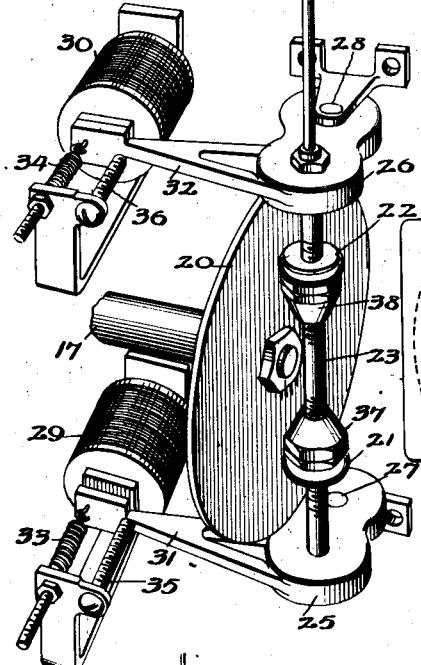
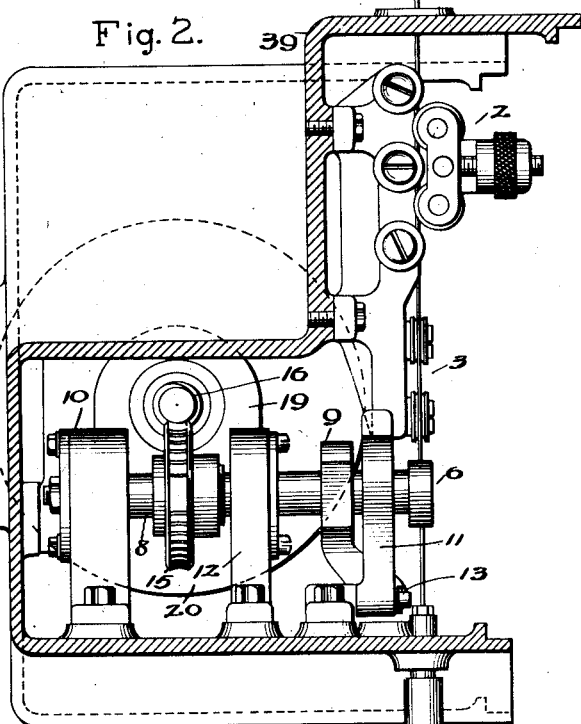
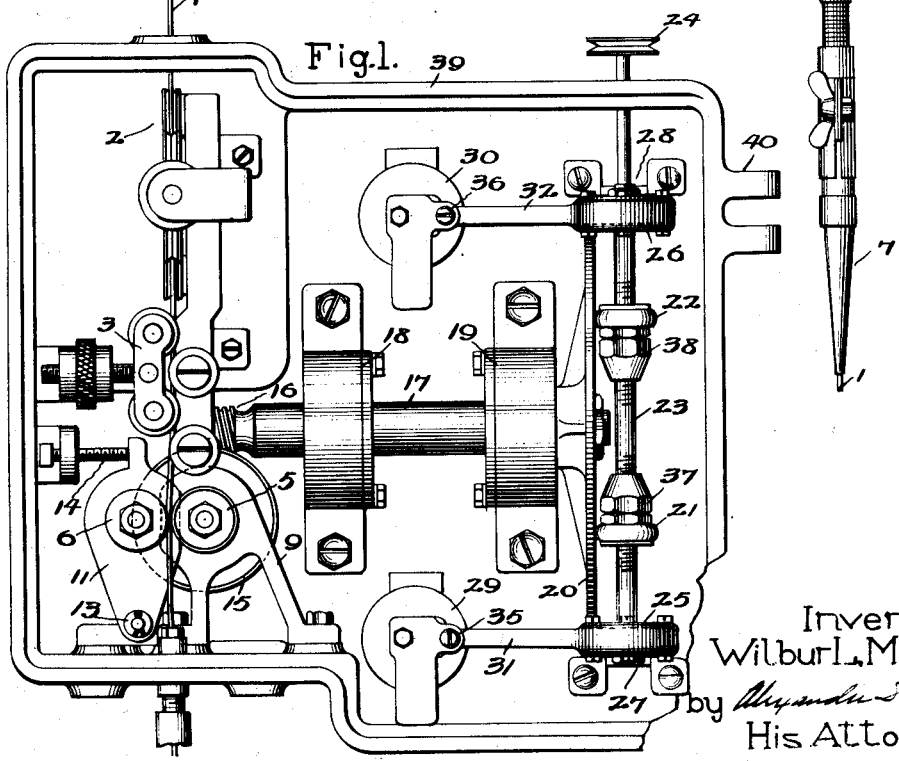
Inventor:
Wilbur L. Merrill
by
His Attorney.

June 9, 1925.

W. L. MERRILL

ARC WELDING MACHINE

Filed April 28, 1924

3 Sheets-Sheet 2

1,541,582

Inventor:
Wilbur L. Merrill,
by *Alexander F. [illegible]*
His Attorney.

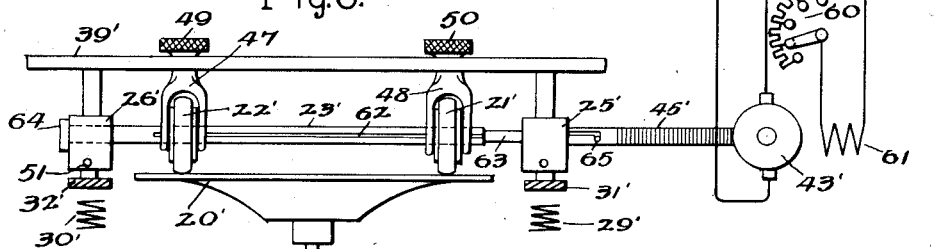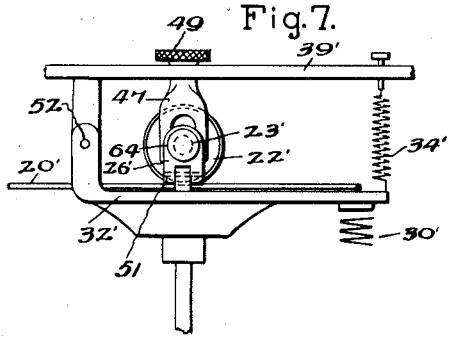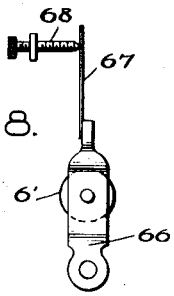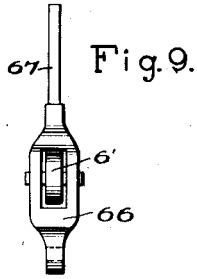

Patented June 9, 1925.

UNITED STATES PATENT OFFICE.

1,541,582

WILBUR L. MERRILL, OF SCHENECTADY, NEW YORK, ASSIGNOR TO GENERAL ELECTRIC COMPANY, A CORPORATION OF NEW YORK.

ARC-WELDING MACHINE.

Application filed April 28, 1924. Serial No. 709,327.

*To all whom it may concern:*

Be it known that I, WILBUR L. MERRILL, a citizen of the United States, residing at Schenectady, in the county of Schenectady, State of New York, have invented certain new and useful Improvements in Arc-Welding Machines, of which the following is a specification:

My invention relates to arc welding and more particularly to machines for automatic arc welding. An object of my invention is to provide an improved machine which is simple in mechanical construction and in the character and operation of the electrical control apparatus and from which are eliminated as far as possible elements which are apt to give trouble during operation, so that a minimum of attention will be required to keep the machine running and little experience will be required to make such repairs as may be occasionally necessary.

Automatic arc welding machines are now well known. In such machines the welding arc is ordinarily struck and maintained between the work to be welded and an electrode which, as it is consumed, is automatically fed toward the work so that the arc is maintained at substantially constant length. Where a metallic electrode is used the electrode fuses rapidly and the metal of the electrode is incorporated in the weld. In order to maintain the arc at substantially constant length, it is customary to regulate the rate at which the electrode is fed in accordance with an electrical characteristic of the arc which varies with and is a measure of the arc length. Such a suitable characteristic is the voltage across the arc. Variations in the voltage across the arc correspond very accurately to variations in the length of the arc and are substantially independent of the current in the arc so that such voltage control is applicable whether the welding current is constant or variable. Where the welding current varies substantially inversely with the voltage across the arc, such variations in current may be used to govern the rate of feed of the electrode instead of the voltage, or both current and voltage variations may be used. The variable current type of system is represented by those systems in which the voltage of the source is substantially constant and the source is connected to the arc through a series stabilizing resistance. In such a system, where the source voltage is substantially twice the normal arc voltage, the current and voltage vary by substantially the same percentage and inversely with respect to each other for small changes in arc length. For metallic arc welding a short arc is desirable and the machine will usually be adjusted for an arc voltage somewhere between 12 and 22 volts. Therefore, if the source voltage is of the order of 40 volts, the current through the arc will vary as sensitively as the voltage across the arc with slight changes in arc length. As the source voltage is increased with respect to the normal arc voltage, current regulation becomes less and less sensitive in such a system. When the source voltage is high with respect to the normal arc voltage, the current in the arc approaches constancy since the voltage drop across the arc is small with respect to the voltage drop across the series resistance and changes in the arc voltage do not greatly affect the value of the current through the arc. Current regulation is feasible where the source voltage is of the order of 60 or 70 volts, since for such voltages the current varies appreciably with variations in the arc length.

Where a constant voltage source of alternating current is used for welding, the series stabilizing resistance is usually replaced by a series stabilizing reactance which is not so wasteful of power as is a series stabilizing resistance.

The variable current type of system is also represented by those systems in which a source is connected to the arc without a series stabilizing resistance and the source voltage is regulated so as to vary inversely with the current. The source may be, for example, a direct current generator, or an alternating current generator or transformer arranged either for inherent regulation or for regulation by a separate regulating means. Such systems may be designed to have a current voltage characteristic which is substantially the same as that produced by the constant voltage series resistance system heretofore referred to.

In welding systems, the value of the current used is adjusted to the value desired for the particular work being done. The best size of electrode to use is also determined by the work to be done. Electrodes for metallic arc welding will range in size from the order of 1/16 inch in diameter to 1/4 inch and larger. The welding currents used range from below 100 amperes to several hundred amperes.

Further objects of my invention are to provide a machine which may be built of standard size and form and be readily adjustable to accommodate any desired range of welding current and size of electrode and which may be used for welding with any desired type of welding circuit whether constant voltage, constant current, variable voltage, direct current or alternating current.

In automatic machines for metallic arc welding it is desirable to provide the electrode in the form of a wire of indefinite length which may be drawn from a reel as it is used. It is customary to provide electrode feed rolls which grip the electrode and feed it forward as it is consumed. The electrode may, however, be used in short lengths and, if desired, the feeding mechanism may operate a rack or the equivalent to which one end of the short length of electrode is secured. It is old in the art to operate such electrode feeding mechanism by means of a variable speed electric motor, the speed of which is automatically varied in accordance with an electrical characteristic of the arc. Such a system is disclosed for example in the application of Paul O. Noble, Serial No. 323,170, filed September 11, 1919, assigned to the same assignee as the present application. It is also old in the art to operate such electrode feeding mechanism from a constant speed driving means and regulate the rate of feed by speed regulating mechanism arranged between the constant speed driving means and the electrode feeding mechanism. Such a system is shown in reissued Letters Patent of the United States to Frank L. Sessions, No. 14,927, granted July 27, 1920.

The present invention relates to improved apparatus for striking and maintaining the arc in accordance with the broad principle of operation disclosed in the Sessions patent aforesaid.

My invention will be better understood from the following description taken in connection with the accompanying drawings, and its scope will be pointed out in the appended claims.

Figure 5:
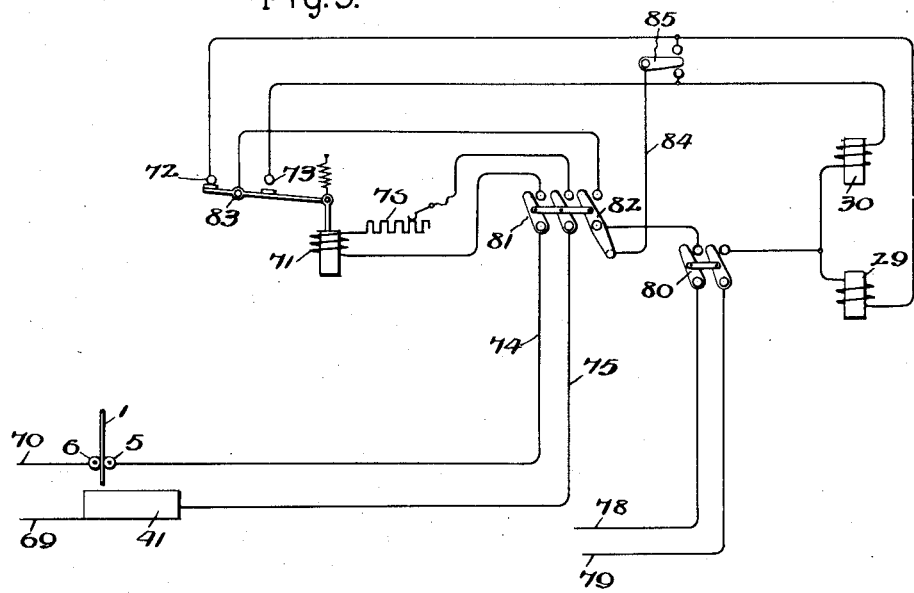

In the drawings Fig. 1 is a front view showing the welding head in its enclosing case with the cover of the case removed; Fig. 2 is a view partly in section taken from the left of Fig. 1; Fig. 3 shows a part of the mechanism of Fig. 1 in perspective; Fig. 4 shows the machine of Fig. 1 in cooperative relation to the work being welded; Fig. 5 is a circuit diagram showing the connections for the electrical control mechanism; Fig. 6 is a diagrammatic representation of a modification of the arrangement shown in Fig. 1; Fig. 7 is a side view of part of the arrangement shown in Fig. 6, and Figs. 8 and 9 illustrate a modified arrangement for mounting one of the feed rolls shown in Fig. 1.

Referring to Figs. 1 and 2, the electrode 1 is shown as passing between groups of straightening rolls 2 and 3, electrode feed rolls 5 and 6 and through an electrode delivery nozzle 7 from which it is delivered toward the work to be welded. The feed roll 5 is shown driven from a shaft 8 supported in bearings 9 and 10. The roll 6 is shown supported in bearings 11 and 12. The bearing 11 is shown pivoted at 13 and suitable adjusting means, shown as a screw 14, is provided for pressing the roll 6 toward the roll 5 to grip the electrode between the rolls. The shaft 8 which drives the electrode feed roll 5 carries a worm wheel 15 driven by a worm 16 on the shaft 17 supported in bearings 18 and 19. The shaft 17 is operated by a driven element shown as a disc 20. Disc 20 is driven by friction rolls 21 and 22 carried on a shaft 23 shown driven by a pulley 24. The friction rolls 21 and 22 engage the disc 20 on opposite sides of its center of rotation. These rolls therefore tend to drive the disc in opposite directions.

In order to regulate the rate at which the electrode is fed by the feed rolls operated by the disc 20, means are provided for moving the friction rolls 21 and 22 into and out of engagement with the disc 20. In the arrangement shown in Figs. 1 and 3, this is accomplished by mounting the driving shaft 23 in bearings 25 and 26 pivoted at 27 and 28. The movement of the bearings 25 and 26 is effected by electromagnetic means shown as magnets 29 and 30, the armatures of which are carried by the arms 31 and 32 which move the bearings about their pivot points. Preferably, as shown in Fig. 3, the bearings are normally moved by springs 33 and 34 so as to disengage the friction rolls 21 and 22 from the disc 20. Adjustable stops 35 and 36 limit the movement of the arms 31 and 32. These stops are preferably adjusted so that the friction rolls barely clear the disc when the bearings are retracted.

The magnets 29 and 30 are connected so as to be controlled in accordance with the electrical condition of the arc, as hereinafter described. The control is such that when the arc is interrupted, one of the friction rolls is moved into engagement with the disc and the other friction roll is moved out of engagement. The engaged roll then drives the disc so as to operate the electrode feeding mechanism to feed the electrode into contact with the work. As soon as the electrode engages the work the first friction roll is moved out of engagement with the disc and the other friction roll moved into engagement with the disc. The disc then operates the electrode feeding mechanism to withdraw the electrode from the work to strike the arc. As soon as the arc exceeds a predetermined length the forwardly driving friction roll is moved into engagement with the disc to reverse the direction of electrode feed again and the electrode is thereafter fed to the arc at whatever rate may be necessary to maintain the arc at substantially constant length. The shaft 23 operating the friction rolls 21 and 22 is preferably driven at a speed considerably higher than would be necessary to feed the electrode at its normal rate of consumption were the forwardly driving friction roll continually maintained in engagement with the disc. It thereby results that the friction rolls 21 and 22 are continually and rapidly vibrated into and out of contact with the disc during welding. The movement required to engage and disengage the friction rolls is very slight and an extremely quick and accurate control of the rate of electrode feed is produced. The control mechanism is at all times ready to respond instantly to any tendency toward variation in the arc length whether due to irregularities in the contour of the work or other causes.

Means are provided whereby the relative driving torques of the friction rolls 21 and 22 may be adjusted. As shown in Figs. 1 and 3 the friction rolls are arranged so that they may be adjusted along the shaft 23 and clamped in any adjusted position by suitable nuts 37 and 38. It is apparent that the driving torque exerted by a friction roll increases as the roll is adjusted along the disc away from its center. By adjustment of the position of the friction rolls the forward and reverse driving torques may be adjusted as well as the forward and reverse rates of electrode feed during the arc striking operation.

In order to eliminate friction and thus reduce the power required and increase the sensitiveness of operation it is desirable to make free use of ball bearings or their equivalent. Inasmuch as the ends of the shaft 23 carrying the friction rolls 21 and 22 rock toward and from the disc it is necessary to arrange the bearings 25 and 26 so that they will not bind. This may be done by using self-aligning ball bearings or equivalent means. The stub shaft carrying the electrode feed roll 6 should also be mounted in the bearing 12 so that movement of the outer bearing about the pivot 13 may take place.

The mechanism just described is preferably enclosed in a case 39 which may be provided with a removable cover. In Fig. 1, one of the hinge elements of such a cover is shown at 40.

The electrode 1 may be used in straight lengths or drawn from a suitably supported reel not shown. While I have shown and described straightening rolls for the electrode, such rolls are not essential where the electrode is as free of bends and kinks as it usually is in practice.

While I have described the means for operating the electrode feeding mechanism as a disc with the friction rolls located each side of the center, it is apparent that any equivalent in construction and operation may be used, and I intend to cover such equivalent constructions by the terms of the appended claims. I deem it preferable to make this disc or driven element light in weight so as to decrease its moment of inertia. It may be made of steel, aluminum or other suitable material.

It is immaterial, as far as my present invention is concerned, how the welding head comprising the electrode feeding mechanism is mounted with respect to the work being welded. It is common in the art of automatic arc welding machines to arrange the welding head so as to be stationary and arrange the work so as to move under the welding head and traverse the arc along the joint to be welded. It is also common to leave the work stationary and move the welding head. In Fig. 4 the work to be welded is shown at 41 and the welding head is shown mounted on a standard 42 which is movable over the work. This standard also supports the electric motor 43 which is shown as provided with a pulley 44 driving the pulley 24 on shaft 23 by means of a belt 45. The motor 43 may be any type of motor which will run at substantially constant speed and means may be provided for adjusting the speed of the motor where desired. If desired, the belt 45 may be arranged to drive the friction rolls through speed changing pulleys to secure speed adjustment.

The welding current may be led into the electrode in any desired manner whether through the feed rolls or at the nozzle 7 or both and also by means of brushes contacting with the moving electrode.

Inasmuch as the friction roll shaft 23 rocks to some extent, the belt 45 should extend from the pulley 24 substantially at right angles to the plane in which the shaft rocks, since otherwise the rocking of the shaft will alternately tighten and slacken the driving belt. It is apparent that any suitable arrangement may be provided for transmitting power from the motor to the friction roll shaft, it being merely necessary to arrange the apparatus to permit the rocking of the friction roll shaft.

In Fig. 6 the motor 43′ is shown as driving the friction roll shaft 23′ through a flexible shaft 45′. In this arrangement the friction rolls 21' and 22' are shown as adjustable along the shaft 23' by means of forks 47 and 48 which may be clamped in adjusted position in the support 39' by suitable means shown as nuts 49 and 50. The support 39' will be slotted to permit the desired adjustment. The bearings 25' and 26' are indicated as carried by the pivoted arms 31' and 32' as more clearly indicated in Fig. 7. In this arrangement also self-aligning bearings may be used. In the construction shown in Figs. 6 and 7 the bearings are indicated as hinged to their supporting arms. The hinged support of bearing 26' is diagrammatically indicated at 51. Arms 31' and 32' should be pivoted substantially in the plane of shaft 23' as indicated at 52 in Fig. 7.

Fig. 6 also indicates diagrammatically the provision of speed changing mechanism between the electrode feeding mechanism 5', 6', and the disk 20' driven by the friction rolls. This speed changing mechanism is indicated as comprising three gears 53, 54 and 55 driven from the shaft on which the worm wheel 15' is mounted. These gears engage gears 56, 57 and 58 respectively. A key longitudinally adjustable by means of the knob 59 may be moved to key any one of the gears 56, 57 or 58 to the shaft which drives the feed roll 5', the other gears then turning loosely as is well known in the art of speed changing gears.

Where speed changing mechanism is provided, it is desirable that it be located between the driven disk and the feed rolls operated thereby, since it is then possible always to operate the friction rolls at a relatively high speed so that they may transmit the power more effectively and be well adapted to control the rate of electrode feed very sensitively. It is, however, possible to secure a fair range of speed adjustment by adjusting the speed at which the friction roll shaft 23' is driven. As indicated in Fig. 6, the motor 43' is provided with an adjustable rheostat 60 for controlling the excitation of the motor field winding 61.

In the course of time the friction rolls wear down and when worn out must be replaced. To enable ready replacement, the parts may be constructed to permit the rolls to be easily slipped off the shaft. As shown in Fig. 6, the shaft is provided with a keyway 62 in which keys of the feed rolls slide. The shaft is shown reduced in size at 63 and provided with a head at 64. A simple bayonet joint 65 may be provided for connecting the flexible shaft 45' to the friction roll shaft 23'. In order to replace the friction rolls it is merely necessary to unlock the bayonet joint and pull the shaft 23' toward the left in Fig. 6. The shaft pulls out of the bearings 25' and 26', and the rolls slide off the right-hand end of the shaft.

Figs. 8 and 9 show a modification of the bearing support for the feed roll 6' which corresponds to the feed roll 6 of Fig. 1. The support 66 is arranged to provide bearings on each side of the feed roll, so that no second bearing, such as the bearing 12 of Fig. 1, is necessary. Where it is desirable to force the roll 6' yieldingly against the electrode, a spring may be provided as is well known in the art. This spring is indicated as a flat spring 67 in Figs. 8 and 9, the pressure against which may be adjusted by the screw 68 as is well known in the art.

Fig. 5 shows a suitable arrangement of the electrical control apparatus for controlling the electromagnetic means which moves the friction rolls as heretofore described. The work 41 is connected to one side of a suitable source of supply, such connection being indicated by the lead 69. The other side 70 of the supply circuit is connected to lead current into the welding electrode.

A relay shown as provided with a winding 71 controls contacts 72 and 73 which respectively complete the circuits of the electromagnets 29 and 30 which control the movement of the friction rolls. Where control in response to the voltage across the arc is used, the winding 71 will be connected in shunt to the arc, and such connection, as shown in Fig. 5, is made through the leads 74 and 75. Suitable means may be provided for adjusting the relay to hold any desired arc voltage, such adjusting means being indicated in Fig. 5 by the adjustable resistance 76. The current for operating the electromagnets 29 and 30 may be taken from any suitable source of substantially constant voltage indicated in Fig. 5 by the leads 78 and 79. A switch 80, which will be closed when the machine is in operation, is provided for controlling the circuit through the leads 78 and 79. A switch 81 is shown which, when moved to the right, connects the winding 71 across the arc, and completes a circuit by means of the blade 82 through one side of the switch 80 to the pivot point 83 of the relay. When the switch 81 is thrown to the left, it opens the circuits to the relay and the blade 82 completes a back-circuit through the lead 84 to switching means represented as a contact 85 which may be moved to complete the circuit to either the magnet 29 or the magnet 30.

The operation of the system will be clear from the description heretofore given, but will be briefly reviewed in connection with the description of the circuit arrangement of Fig. 5. To begin the welding, the operator closes the switch 80 and moves the switch 81 to the right to connect winding 71 across the arc. He also completes the welding circuit represented by the leads 69 and 70. If the electrode is out of contact with the work, the voltage applied to the relay winding 71 will be high and the relay will complete the contact 72 which will energize the magnet 30 through a circuit leading from the lead 78 through the switch 80, switch 82, point 83, contact 72, magnet 30, and switch 80 to lead 79. The magnet 30 will move the friction roll 22 of Fig. 1 into engagement with the disk and the electrode feeding mechanism will be operated in a direction to feed the electrode into contact with the work. As soon as the electrode engages the work, the relay winding 71 will be deenergized, and the relay will energize the magnet 29, and deenergize the magnet 30. The friction roll shaft will therefore be rocked to engage the other friction roll and cause the electrode to be withdrawn from the work to strike the arc. As soon as the welding arc has reached a predetermined length the winding 71 will be energized sufficiently to interrupt contact 73 and complete contact 72. The forward direction of electrode feed will then be resumed, and thereafter the relay contacts will rapidly vibrate and control the rate at which the electrode is fed to maintain the arc length substantially constant, as heretofore described.

According to the operation described in the foregoing paragraph, the electrode and the work are connected to the source of supply so that the welding circuit is completed as soon as the electrode touches the work. With this method of operation there is sometimes a tendency for the electrode to stick to the work, but the mechanism operates with sufficient quickness and power to strike the arc without difficulty. According to another method of operation the connection to the source is made immediately after the electrode engages the work and with such method of operation the tendency of the electrode to stick or butt weld to the work is eliminated. It is apparent that my invention is equally applicable to such a mode of operation. Where control in accordance with arc voltage is used, the relay winding is connected on the source side of the switch which completes the connection to the source and as soon as the switch closes, the relay winding becomes responsive to arc voltage.

In order to enable the operator manually to control the feeding of the electrode, switch 81 of Fig. 5 may be thrown to the left thus disconnecting the relay winding 71 and completing the control circuit through the blade 82 of the switch 81 to the control switch 85. By moving switch 85 to its respective positions the circuits of the magnets 29 and 30 may be controlled selectively. The switch 85 diagrammatically represents any suitable controlling means which may in practice comprise push buttons arranged for convenient access by the operator of the machine.

As heretofore indicated, it is apparent that any desired supply circuit may be used for supplying the welding current with the arrangement shown in Fig. 5. If a constant current system is used, the supply leads 69 and 70 will be in series with the constant current circuit which may supply one or several welding arcs in a manner well known in the art. The current through the arc then remains substantially constant, but the control mechanism will maintain the arc length substantially constant since variations in the voltage across the arc are an accurate measure of variations in the length of the arc. If the welding circuit is supplied from a constant voltage source, a series stabilizing resistance will be used as heretofore indicated. Since, however, the control winding 71 is connected to respond to arc voltage, it will maintain the arc length substantially constant since, as heretofore stated, the voltage across the arc is sensitively responsive to changes in arc length in any type of welding system. If the arc is supplied from an inherently regulated source, such as a generator or transformer, no stabilizing resistance need be used. The controlling relay here again responds to arc voltage and maintains the arc length substantially constant. For example, the source for supplying the welding current may be a generator of the type shown in Letters Patent of the United States to Sven R. Bergman, 1,340,004, May 11, 1920. Such a generator is provided with a pair of variable voltage brushes which are connected to the welding circuit and is also provided with a pair of brushes across which the voltage is substantially constant. With such a generator the control circuit 78, 79 of Fig. 5, as well as the circuit of the motor 43, which drives the friction rolls, may be supplied from the constant voltage brushes. With the constant voltage series resistor type of system the control circuit 78, 79 and the motor 43 may be supplied from the constant voltage side of the series stabilizing resistance. It is obvious that either alternating or direct current may be used since the electromagnets 29 and 30 and the control winding 71 may be designed to operate with alternating current as readily as with direct current. Moreover, the constant speed motor 43 may obviously be any well known type of motor operable from either alternating current or direct current or both. It is also obvious that the drive from motor 43 may be replaced by a drive from a line shaft or other suitable source of power.

In those variable current systems wherein the current through the arc varies fairly sensitively with changes in arc voltage, the control winding 71 may be connected in series relation with the welding circuit as is well known in the art. With such series connection the control solenoid must be adjusted for any adjustment of the normal value of the welding current. With the shunt connection of the control winding such adjustment is unnecessary unless it is desired to change the arc length.

When it is desired to use a different size of electrode, the speed changing mechanism shown in Fig. 6 may be adjusted to suit the new electrode. Adjustment can also be made by adjusting the position of the friction rolls and by adjusting the speed at which the friction rolls are driven. It is preferable to operate the machine with the friction rolls so adjusted that the relay, through the controlling winding 71, is kept in continuous vibration, since with such adjustment the control will be exceedingly sensitive and will maintain the arc length very closely constant.

Where the control winding 71 is connected in shunt to the arc, as shown in Fig. 5, it is desirable, although not essential, that protective means be provided for preventing the application to this winding of voltages high compared to the normal arc voltage. As heretofore indicated, the normal arc voltage with a metallic arc will be somewhere between 12 and 22 volts. If the open circuit voltage of the source is of the order of 60 to 75 volts, it is preferable to provide a protective relay for preventing the application, or continued application, of this relatively high voltage to the winding 71 when the arc is interrupted. Such protective means, however, form no part of my present invention and do not introduce any complication into the control circuits.

While I have described my invention more particularly in connection with metallic arc welding, it is apparent that the same control mechanism may be used to control the arc length in carbon arc welding where the carbon is clamped in a suitable holder moved by the feeding mechanism. A carbon electrode does not wear away as rapidly as does a metallic electrode and it is not so essential to maintain the arc length so closely constant as in metallic arc welding. The arc voltage is also greater with the carbon arc. It is also apparent that any type of electrode which cannot be fed through the feed rolls may be used in the same way that a carbon electrode is used.

What I claim as new and desire to secure by Letters Patent of the United States, is:—

1. An arc welding machine comprising electrode feeding mechanism, means for operating said feeding mechanism comprising a rotatable disc, a friction roll for driving said disc, means for moving said roll into and out of engagement with the disk to control the speed at which said feeding mechanism is operated and means arranged and connected to control said roll moving means in accordance with an electrical characteristic of the arc which varies with the arc length and vary the rate of electrode feed to maintain the arc length substantially constant.

2. An arc welding machine comprising electrode feeding mechanism, means for operating said mechanism comprising a rotatable disc, a pair of friction rolls arranged respectively to drive said disc in opposite directions, means for moving said rolls into and out of engagement with the disc to control the speed and direction of operation of said feeding mechanism and means arranged and connected to control said roll moving means in accordance with an electrical characteristic of the arc which varies with the arc length to feed the electrode forward and withdraw it to strike the arc and vary the rate of electrode feed to maintain the arc length substantially constant.

3. An arc welding machine as claimed in claim 2 comprising means whereby the driving torques which the respective friction rolls exert on the disc when engaged therewith may be adjusted.

4. An arc welding machine comprising electrode feeding mechanism, means for operating said mechanism, comprising a rotatable disc, a pair of friction rolls arranged to engage said disc on opposite sides of its center of rotation, a shaft carrying said rolls, movable bearings for supporting said shaft, electromagnetic means arranged to control the movement of said bearings to move said rolls into and out of contact with said disc, and a relay comprising a winding responsive to an electrical characteristic of the arc which varies with the arc length for controlling said electromagnetic means to control the operation of said feeding mechanism in accordance with the condition of the arc.

5. An arc welding machine as claimed in claim 4 comprising means whereby the friction rolls may be adjusted along the shaft to adjust the distance between either friction roll and the center of the disc and thereby adjust the driving torques of the respective rolls when engaged with the disc.

6. An arc welding machine comprising electrode feeding mechanism, means for operating said feeding mechanism comprising a rotatable disc and a friction roll for driving said disc, a constant speed motor for driving said friction roll, means responsive to an electrical condition of the arc which varies with the arc length arranged to move said friction roll into and out of engagement with said disc to control the speed at which it is driven, and speed adjusting means between said disc and the feeding mechanism operated thereby.

7. An arc welding machine comprising electrode feeding mechanism, means for operating said feeding mechanism comprising a driven element, friction rolls cooperating with said element for exerting opposite driving torques thereon, means for driving said friction rolls at a constant speed relatively high with respect to the speed of said driven element, electromagnetic means for moving said rolls into and out of engagement with said driven element, and a relay connected to be responsive to an electrical characteristic of the arc which varies with the arc length adapted to control said electromagnetic means to move said rolls alternately into engagement with said driven element.

8. An electric arc welding machine comprising an electrode feed mechanism, means for transmitting motion to said mechanism comprising a driven element, a driving element for causing torque to be exerted on said driven element in opposite directions, means for operating said driving element at a speed which is relatively high with respect to the speed of said driven element, electromagnetic means for moving said driving element rapidly into and out of engagement with said driven element to regulate the speed thereof, and means arranged to be operated in accordance with the length of the electric arc for controlling the operation of said electromagnetic means.

In witness whereof, I have hereunto set my hand this 25th day of April, 1924.

WILBUR L. MERRILL.